United States Patent [19]

Ishizuka et al.

[11] Patent Number: 4,675,671

[45] Date of Patent: Jun. 23, 1987

[54] LOOP NETWORK SYSTEM

[75] Inventors: Takuo Ishizuka; Masao Kato, both of Hadano, Japan

[73] Assignee: Hitachi, Ltd., Tokyo, Japan

[21] Appl. No.: 687,168

[22] Filed: Dec. 28, 1984

[30] Foreign Application Priority Data

Dec. 28, 1983 [JP] Japan .................. 58-247193

[51] Int. Cl.$^4$ .................. H04Q 9/00; G06F 3/04
[52] U.S. Cl. .................. 340/825.050; 370/86
[58] Field of Search .................. 340/825.05; 370/86

[56] References Cited

U.S. PATENT DOCUMENTS

| | | | |
|---|---|---|---|
| 4,295,122 | 10/1981 | Hatada et al. | 340/825.500 |
| 4,410,985 | 10/1983 | Yasumoto et al. | 340/825.05 |
| 4,445,116 | 4/1984 | Grow | 340/825.05 |
| 4,510,494 | 4/1985 | Mizokawa et al. | 340/825.05 |
| 4,566,097 | 1/1986 | Bederman | 370/86 |

Primary Examiner—Donald J. Yusko
Attorney, Agent, or Firm—Antonelli, Terry & Wands

[57] ABSTRACT

In a loop network system in which a plurality of nodes are connected in the form of a loop, and a token frame is transmitted to shift the data transmit right among the nodes, the token frame transmitted from a node includes information for reserving the data transmit right of its own node even after allocation of the data transmit right to another node, so that a full duplex communication linkage can be established between the node having acquired the data transmit right by receiving the token frame and the node having transmitted the token frame. The token frame further includes a level mask field specifying the data transmit right allocation level so that the data transmit right is shifted according to the allocation level.

4 Claims, 6 Drawing Figures

| DELs | DA | SA | M | C | FCS | DELe |

LOOP NETWORK SYSTEM

BACKGROUND OF THE INVENTION

This invention relates to a loop network system of the token controlled type, and more particularly to a system of the type above described which is suitable for controlling acquisition of the right to transmit data.

In a loop network system of the token controlled type, a frame for controlling the right to transmit data, which frame is called a token frame, is transmitted to a loop transmission line for controlling the shift of the data transmission right among a plurality of nodes connected to the loop transmission line. The conventional protocol used for allocation of the data transmission right to one of such nodes by transmission of the token frame is broadly classified into two modes of operation. According to the first mode of operation, the node nearest to a node which has transmitted the token frame has the highest priority right, and the node remotest from the node which has transmitted the token frame has the lowest priority right. (That is, in this mode of operation, the priority order is not based on the logical level.) According to the second mode of operation, a priority level bit is provided in the token frame, and a node cannot acquire the data transmit right unless the level of a frame to be transmitted from the specific node is higher than the priority level provided in the token frame when the specific node has received the token frame.

Various problems as described below arise in the case of the prior art system when, for example, a channel unit of a central processor is connected together with high-speed input/output units to an optical loop network, so that the input/output operation of the input/output units can be controlled under command of the channel unit. Herein, the node corresponding to the channel unit is called a master node, and the node corresponding to the input/output unit is called a slave node.

(1) Generally, the frame transfer request transmitted from each of the slave nodes to the master node includes various levels such as a data transfer request from the input/output unit, a report of the end of operation of the input/output unit, a report of an interrupt occurring independently of the command from the master node, a report of trouble having occured in the input/output unit, etc. The master node must decide which level of the transfer request from the slave node is to be accepted depending on its own internal status and the importance of the request. However, the master node to which such a request is transmitted cannot freely select the request level.

(2) The master node is determined already and, to that node, the frame transfer request is to be transmitted from the slave node. It is therefore necessary that the frame from the slave node is to be transmitted to the master node, only when the master node is free. That is, it is necessary for the slave node to carry out acquisition of the data transmission right only as to the frame for which the data transmission right is allotted from a predetermined master node. However, according to the prior art system, there are no means permitting selective acquisition of the data transmission right, and the prior art system is not suitable for the control of the data transmission right in the case where a plurality of channel units are connected to a single loop.

(3) When data transfer at a high speed is requested between one of the slave nodes forming a pair with the master node, data cannot be transferred at high speed according to the prior art system, since only a half-duplex data communication linkage can be established due to the fact that only one of the nodes has the data transmission right.

SUMMARY OF THE INVENTION

It is a primary object of the present invention to provide a novel and improved loop network system of the token controlled type which can perform a function equivalent to that of a data transfer request from an input/output unit to a channel unit in a conventional I/O interface.

In accordance with the present invention, which attains the above object, a token frame used for controlling the shift of the data transmission right among a plurality of nodes includes a control field reserving the right to transmit data from its own node even after allocation of the data transmission right to another node, thereby inhibiting transmission of data from still another node which has not acquired the data transmission right, and a data communication linkage is established between the node which has received the token frame and acquired the data transmission right and the node which has transmitted the token frame, so as to permit data reception and transmission though a full-duplex communication linkage established between these two nodes only.

BRIEF DESCRIPTION OF THE DRAWINGS

FIG. 4 shows the relation between the level mask of the token frame and the contents of registers in the slave node.

DESCRIPTION OF THE PREFERRED EMBODIMENTS

Figures 1, 2:
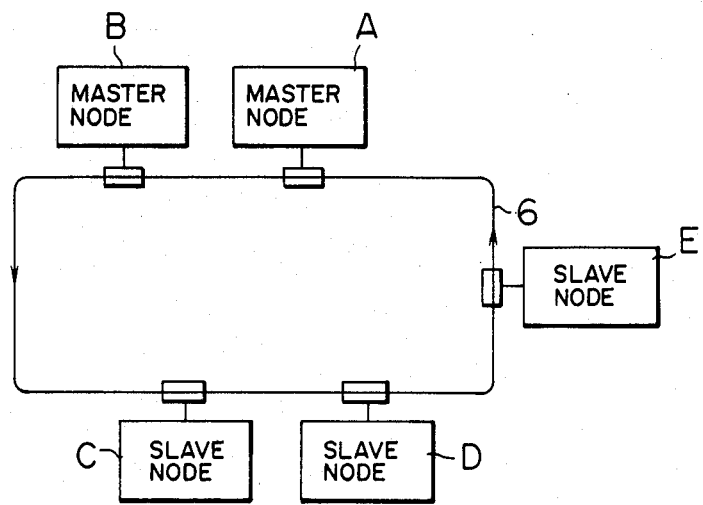
FIG. 1 shows the arrangement of a loop network system to which the present invention is applied.
FIG. 2 illustrates an example of a format of a token frame emloyed in the present invention.

Referring to FIG. 1 showing the arrangement of a loop network system to which the present invention is applied, a plurality of nodes A to E are connected to a loop transmission line 6. In FIG. 1, it is supposed that the nodes A and B are master nodes (channel units), and the nodes C, D and E are slave nodes (input/output units).

FIG. 2 illustrates an example of a format of a token frame employed in the present invention. Referring to FIG. 2, the token frame includes frame-dividing delimiter fields DELs and DELe, a destination address field DA, a source address field SA, a level mask field M, a control field C, and a frame check sequence FCS. The token frame is separated from adjoining data frames by a time fill which is formed by special data filling the gap therebetween. This token frame is transmittd from the master node A or B in the loop network and is received by the slave node C, D or E. The slave node having received the token frame acquires the right to transmit data to the master node A or B. The slave node C, D or E having acquired the data transmission right transfers to data frame to that master node A or B which has transmitted the token frame, and the master node A or B transfers a data frame to the slave node C, D or E which has acquired the data transmission right. This token frame is used for commanding the specific slave node which has acquired the data transmission right, and the master node which has transmitted the token frame does not lose its data transmission right. The slave node which has acquired the data transmission right cannot transmit to the other slave nodes the token frame allocating the data transmission right.

Figure 3:
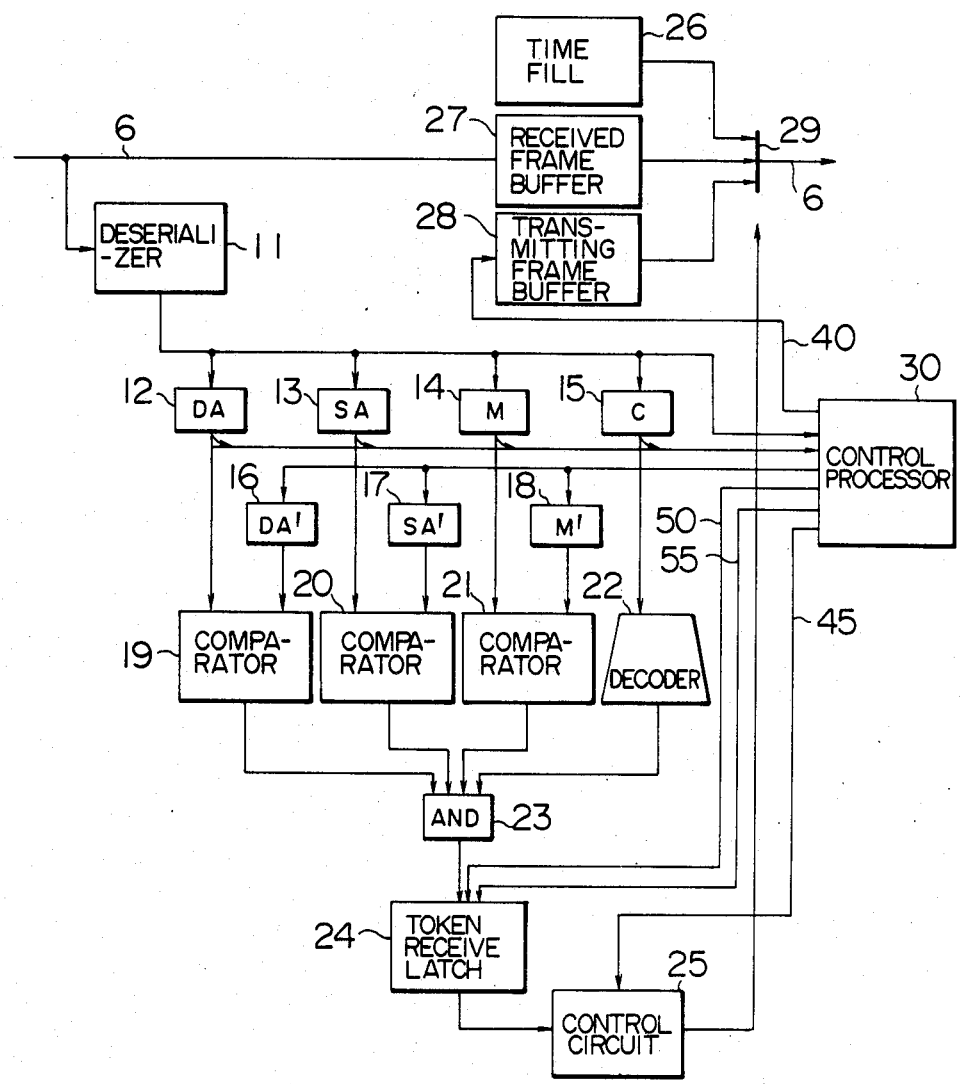
FIG. 3 shows one form of the structure of a master node and a slave node in an embodiment of the loop network system according to the present invention.

FIG. 3 shows one form of the structure of the reception and transmission control part in the master and slave nodes in accordance with an embodiment of the present invention. Referring to FIG. 3, the embodiment comprises a deserializing circuit 11, and registers 12 to 15 for registering the destination address field DA, source address field SA, level mask field M and control field C in the token frame, respectively. The embodiment further comprises registers 16 to 18 for registering an address DA' to be compared with the destination address DA, an address SA' to be compared with the source address SA, and a level mask M' to be compared with the level mask M, respectively. Such data DA', SA' and M' are supplied from a control processor 30. The embodiment further comprises comparator circuits 19 to 21, a decoder 22, an AND circuit 23, a token receive latch 24, a control circuit 25, a time-fill generating circuit 26 producing special data for filling the gap between adjoining frames, a received frame buffer 27, a transmitting frame buffer 28, and a selection circuit 29. The selection circuit 29 selects the contents of any one of the circuit 26, buffer 27 and buffer 28 in accordance with a selection control signal received from the control circuit 25, and sends the selected data to the transmission line 6. The control processor 30 is used for controlling all of the master and slave nodes.

The manner of control on the basis of the token frame will now be described with reference to, for example, the case where the slave node D receives the token frame transmitted from the master node B to acquire the data transmission right, and a full-duplex communication linkage is finally established therebetween. It is supposed that the level mask field M in the token frame is, for example, a bit sequence of 1 byte, and the bit 1 represents a data transfer request level (level 1), while the bit 2 represents an input/output operation end report level (level 2). The remaining bits have no concern with the present invention, and description thereof will not be made herein.

Suppose now that a token frame for allocating the data transmission right is transmitted to the master node A at the start of the operation of the loop network system, and the master node A acquires the data transmission right. When the master node A has not any special data to be transmitted, the master node A abandons its data transmission transmit right and transmits the token frame allocating the data transmission right to the master node B. Upon reception of the token frame, the master node B acquires the data transmission right. A full-duplex comminication linkage between the master node B and, for example, the slave node D is established in a manner to be described presently.

The master node B having now acquired the data transmission right transmits a token frame having a format as shown in FIG. 2 for the purpose of, for example, reception of an input/output operation end report.

Referring to FIG. 3, in the master node B, the token frame shown in FIG. 2 is applied from the control processor 30 to the transmitting frame buffer 28 through a signal line 40. This token frame is such that the address of the slave node D is set in the destination address field DA, the address of the master node B is set in the soure address field SA, a "1" is set at the position of the bit 2 of the level mask field M, and a "1" is set in the control field C as control data commanding the reserve of the data transmission right for the purpose of establishing the full-duplex communication linkage between the master node B and the slave node D. Further, a "1" is set in the token receive latch 24 for reserviing the data transmission right in the master node B. Such a token frame is transmitted from the transmitting frame buffer 28 under command of the control circuit 25.

Suppose now that the bit 2 is a "1" in the level mask field M in the token frame transmitted from the master node B, as shown in FIG. 4(a), and the data transmission right is allocated to the slave node requesting transmission of an input/output operation end report. Suppose further that the bit 1 is a "1" in the level mask register 14 in the slave node C, meaning that the slave node C requests data transfer to the master node B, as shown in FIG. 4(b). Also, the bit 2 is a "1" in the level mask register 14 in the slave node D, meaning that the slave node D requests transfer of the input/output operation end report to the master node B, as shown in FIG. 4(c).

The token frame transmitted from the master node B is transmitted to the master node A by way of the transmission line 6. However, in the master node A, the AND circuit 23 is in its off state, and the token receive latch 24 is in the state "0". Therefore, the control circuit 25 commands the selection circuit 29 to select the received frame buffer 27, and the token frame transmitted to the master node A is transferred intact to the slave node C.

In the slave node C, the token frame transmitted via the transmission line 6 is serially stored in the received frame buffer 27, and, at the same time, the bit serial data of the token frame is sequentially converted into byte serial data by the deserializing circuit 11. The destination address field DA, source address field SA, level mask field M and control field C in the token frame converted into the byte serial data are set in the registers 12 to 15 respectively. The data registered in the register 12 represents the group address specifying the slave node group, and, herein, specifies the group address including, for example, the slave nodes C and D. The data registered in the register 13 represents the address of the master node B. The data registered in the register 14 is as shown in FIG. 4(a) in which it will be seen that the bit 2 is a "1".

On the other hand, when there is a request such as a data transfer request or an end report request, the address DA' for comparison with the destination address DA, the address SA' for comparison with the source address SA and the mask M' for comparison with the level mask M are set in the respective registers 16, 17 and 18 from the control processor 30. The data registered in the register 16 represents the group address of the slave node C. Since the slave node C holds the data transfer request or requests data transfer to the master node B, the data registered in the register 17 represents the address of the master node B. The data registered in the register 18 is as shown in FIG. 4(*b*) in which it will be seen that the bit 1 is a "1".

The comparison circuit 19 compares the data registered in the registers 12 and 16 to check the slave node group to which the data transmit right is to be allocated on the basis of the token frame. The comparison circuit 20 compares the data registered in the registers 13 and 17 to check the master node which allocates the data transmit right. The comparison circuit 21 compares bitwise the data registered in the registers 14 and 18 to check the level of the request for allocation of the data transmit right. An output "1" appears from each of the comparison circuits 19, 20 and 21 when the coincidence between the data is reached. The decoder 22 decodes the data registered in the control field register 15, and an output "1" is outputted from the decoder 22 in response to a token frame transmitted thereto. When the token frame is one by which the master node B acquires the data transmit right.

The outputs of the comparison circuits 19, 20 and 21 are applied to and AND circuit 23 together with the output of the decoder 22. When the AND condition of the AND circuit 23 holds, the token receive latch 24 is set, while, when the AND condition does not hold, the token recieve latch 24 is not set. In the slave node C, the token receive latch 24 is not set since the output of the comparison circuit 21 is a "0" although the output of each of the comparison circuits 19, 20 and decoder 22 is a "1". In this case, the control circuit 25 commands the selection circuit 29 to select the received frame buffer 27, and the token frame stored in the received frame buffer 27 is sent out intact to the transmission line 6.

The token frame sent out from the slave node C is applied to the slave node D. As in the aforementioned case of the slave node C, the token frame is stored in the received frame buffer 27, and, at the same time, the bit serial data of the token frame is sequentially converted into byte serial data by the deserializing circuit 11. The destination address field DA, source address field SA, level mask field M and control field C are similarly set in the registers 12 to 15 respectively. The data registered in the registers 12 to 15 are the same as those described with reference to the case of the slave node C. On the other hand, the address DA' for comparison with the destination address DA, the address SA' for comparison with the source address SA and the mask M' for comparison with the level mask M are set in the respective registers 16, 17 and 18 from the control processor 30. The data registered in the register 16 represents the group address of the slave node D, the data registered in the register 17 represents the address of the master node B, and the data registered in the register 18 is as shown in FIG. 4(*c*) in which it will be seen that the bit 2 is a "1". In the slave node D, therefore, the output of each of the comparison circuits 19 to 21 is a "1", and the output of the decoder 22 is also a "1". The resultant output of the AND circuit 24 in the state "1". Consequently, the slave node D acquires the data transmission right, and, under command of the control circuit 25, the data from the time-fill generation circuit 26 or the data (the input/output operation end report) from the transmitting frame buffer 28 is selected by the selection circuit 29 to be sent out to the transmisson line 6. When the time is reached at which the master node B must abandon the data transmission right due to the termination of the full duplex communicaton between it and the slave node D, the master node B abandons the data transmission right and transmits the token frame toward the master node A to allocate the data transmission right to the master node A, so that the master node A can acquire the data transmission right.

Figure 5:
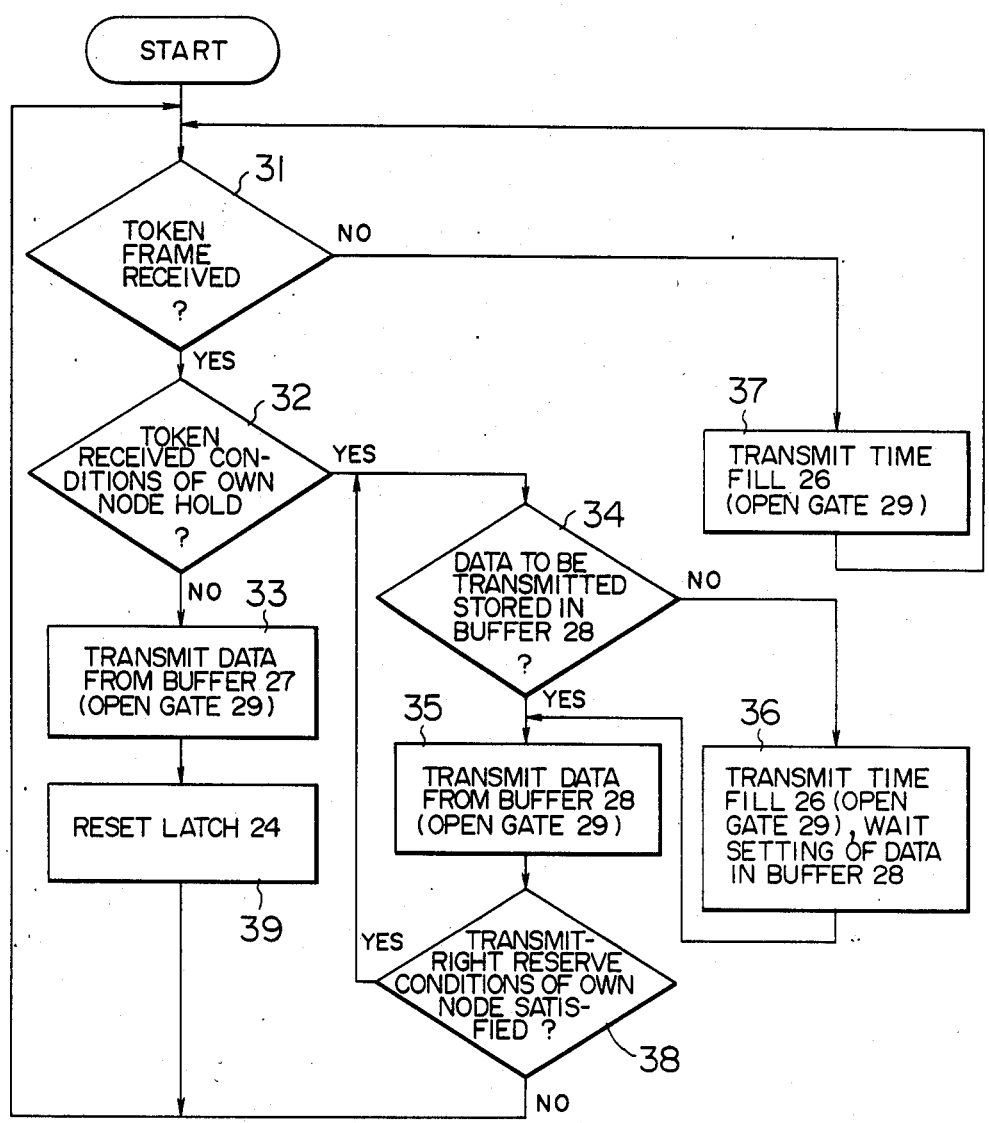
FIG. 5 is a flow chart showing the steps of control in the control circuit shown in FIG. 3.

FIG. 5 is a flow chart showing the steps of control by the control circuit 25.

In the step 31, whether of not the token frame has been received is detected on the basis of identifier information. When the result of detection proves that the token frame has not yet been received, transmission of the output of the time fill generationn circuit 26 is commanded in the step 37. On the other hand, when the result of detection in the step 31 proves that the token frame has been received, whether or not the condition for reception of the token frame holds in the node to which the control circuit 25 belongs is checked, that is, the status of the token receive latch 24 is checked in the step 32. When the result of the check in the step 32 is "NO", the gate of the selection circuit 29 is opened in the step 33 so as to transmit the data stored in the received frame buffer 27. On the other hand, when the result of the check in the step 32 is "YES", whether or not the transmitting frame buffer 28 stores the data to be transmitted is checked in the step 34. When the result of this check in the step 34 is "NO", the output of the time fill generation circuit 26 is transmitted in the step 36, and the node waits until the data to be transmitted is set in the transmitting frame buffer 28. On the other hand, when the result of the check in the step 34 is "YES", the data set in the transmitting frame buffer 28 is transmitted in the step 35.

After transmission of the data from the transmitting frame buffer 28, whether or not the condition for holding the data transmission right in its own node is satified, that is, whether or not the token receive latch 24 is in the set state is checked in the step 38. When the result of this check in the step 38 is "YES", the step 38 is followed by the step 34. On the other hand, when the result of the check in the step 38 is "NO", that is, when the token receive latch 24 is in its reset state, the step 38 is followed by the step 31.

The data transmitted from the slave node D to the master node B by way of the transmission line 6 shown in FIG. 3 is stored in the received frame buffer 27 in the master node B. The control processor 30 fetches the contents of the register 12 to 15, and, after confirming that the data has been directed to its own node, processes the transmitted data.

Thus, once the token receive latch 24 in one node is set in the state "1", the token frame stored in the received frame buffer 27 is not transmitted until another token frame selecting node is transmitted or until the token receive latch 24 of its own node is reset under command of the control processor 30. In other words, in the node which has not acquired the data transmission right, that is, in the node in which the token receive latch 24 is kept in the reset state, the content of the received frame buffer 27 only are always transmitted. Therefore, only the node having acquired the data transmission right can transmit a data frame of any desired length to the master node at any desired time. At the same time, the data received in the specific node can be transmitted to the master node through the control processor 30, so that the full duplex communication linkage can be established between, for example, the specific slave node D and the specific master node B.

Figure 6:
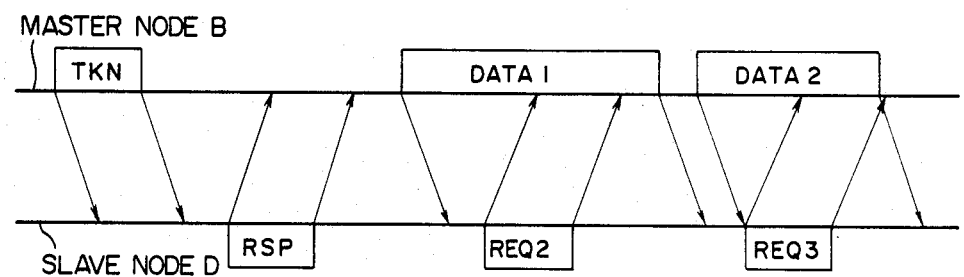
FIG. 6 illustrates an example of a reception and transmission sequence between one of the master nodes and one of the slave nodes.

An example of the full duplex communication between the master node B and the slave node D will be described with reference to FIG. 6. In response to the transmission of a token frame TKN from the master node B, the slave node D returns a response frame RSP to the master node B. This response frame RSP includes a data transfer request status in addition to the status display of the slave node D. Upon reception of this response frame RSP, the master node B transmits a data frame DATA1. Then, the slave node D transmits a data request frame REQ2 requesting subsequent data transfer. Upon completion of transmission of the data frame DATA1, the master node B starts transfer of a succeeding data frame DATA2. Such an operation is repeated until all the data is transferred between the master node B and the slave node D in the full duplex communication mode.

It will be understood from the foregoing detailed description that, according to the token-controlled loop network system of the present invention, full duplex communication can be attained between a master node and a slave node of the level requested by the master node. Therefore, the token-controlled loop network system can exhibit a function equivalent to the manner of data transfer from an input/output unit to a channel unit in a conventional I/O interface.

We claim:

1. A loop network system in which a plurality of nodes, including at least one master node and one or more slave nodes, are connected in the form of a loop by a transmission line, and information to be transmitted is transmitted as a frame from node to node in a direction from an upstream node to a downstream node by way of said transmission line, comprising:

holding means in each of said nodes for holding a token signal indicating a data transmission right;

first means disposed in each node and responsive to the holding means therein for transmitting on said transmission line to another node a frame of information only when said holding means therein holds a token signal;

second means disposed in said master node and connected to said first means therein for generating frames of information, including a token frame having a token signal, for transmission by said first means therein on said transmission line, and for applying to said holding means therein a token signal when the first means therein is to transmit a token frame to another node; and third means in each slave node for storing a frame of information received from another node via said transmission line when the frame of information is destined for that node and for applying to the holding means in that node a token signal when the recieved frame of information is a token frame, whereby the master node and the slave node which have a token signal in their holding means may effect full-duplex communication via said transmission line.

2. A loop network system according to claim 1, wherein said first means includes transmitting frame means connected to receive a frame of information for transmission on said transmission line and received frame means connected to receive a frame of information from said transmission line for re-transmitting said frame of information on said transmission line, and selector means controlled by said holding means for connecting said transmitting frame means to said transmission line to transmit a frame of information thereon when said holding means holds a token signal and for connecting said received frame means to said transmission line to re-transmit a received frame of information when said holding means does not hold a token signal.

3. A loop network system according to claim 2, wherein said second means generates a frame of information which includes destination address information, source address information and level mask information relating to a type of communication to be established with a node station, and said third means includes means for determining whether a received frame of information is destined for the slave node including the third means which receives the frame of information on the basis of the received destination address information and level mask information.

4. A loop network system as claimed in claim 3, wherein said third means includes means for comparing a destination address, a source address and level mask information included in a received frame of information with a destination address, a source addess and level mask information previously stored for comparison purposes in the node and means responsive to said comparing mean*s for storing in said holding means of the node a token signal as received in the frame only when a comparison is detected by said comparing means.

* * * * *